US005569847A

United States Patent [19]

Hasegawa et al.

[11] Patent Number: 5,569,847

[45] Date of Patent: Oct. 29, 1996

[54] AIR-FUEL RATIO ESTIMATOR FOR INTERNAL COMBUSTION ENGINE

[75] Inventors: Yusuke Hasegawa; Yoichi Nishimura; Isao Komoriya; Shusuke Akazaki; Eisuke Kimura, all of Wako, Japan

[73] Assignee: Honda Giken Kogyo Kabushiki Kaisha, Tokyo, Japan

[21] Appl. No.: 517,855

[22] Filed: Aug. 22, 1995

Related U.S. Application Data

[63] Continuation of Ser. No. 305,191, Sep. 13, 1994, abandoned.

[30] Foreign Application Priority Data

Sep. 13, 1993 [JP] Japan .................................... 5-251140

[51] Int. Cl.[6] ................................ G01L 3/26; G01L 5/13

[52] U.S. Cl. .......................................... 73/117.3; 73/118.2

[58] Field of Search .................................. 73/116, 117.3, 73/118.2

[56] References Cited

U.S. PATENT DOCUMENTS

| | | | |
|---|---|---|---|
| 4,388,906 | 6/1983 | Sugiyama et al. | 123/492 |
| 4,884,548 | 12/1989 | Sogawa . | |
| 4,953,530 | 9/1990 | Manaka et al. | 123/399 |

FOREIGN PATENT DOCUMENTS

| | | |
|---|---|---|
| 0553570 | 12/1992 | European Pat. Off. . |
| 0546579 | 12/1992 | European Pat. Off. . |
| 59-101562 | 6/1984 | Japan . |
| 4-369471 | 12/1992 | Japan . |
| 5-180040 | 7/1993 | Japan . |

*Primary Examiner*—Richard Chilcot
*Assistant Examiner*—Max Noori
*Attorney, Agent, or Firm*—Nikaido Marmelstein Murray & Oram LLP

[57] ABSTRACT

An air-fuel ratio estimator for estimating air-fuel ratio of an air and fuel mixture supplied to an internal combustion engine from an output of an air-fuel ratio sensor. In the estimator, detection response lag time of said air-fuel ratio sensor is approximated as a first-order lag time system to produce state equation from said first-order lag time system. The state equation is discretized for a period delta T to obtain a discretized state equation. A transfer function is calculated from the discretized state equation and is then an inverse transfer function is calculated from said transfer function. And correction coefficient of said inverse transfer function is determined and multiplying with inverse transfer function to the sensor output estimate an air-fuel ratio of an air and fuel mixture supplied to the engine. The correction coefficient is predetermined with respect to engine speed and is made zero at or below a predetermined engine speed.

9 Claims, 13 Drawing Sheets

AIR-FUEL RATIO ESTIMATOR FOR INTERNAL COMBUSTION ENGINE

This application is a continuation of application Ser. No. 08/305,191 filed Sep. 13, 1994, now abandoned.

BACKGROUND OF THE INVENTION

1. Field of the Invention

This invention relates to an air-fuel ratio estimator for an internal combustion engine, more particularly to an air-fuel ratio estimator for a multicylinder internal combustion engine for estimating the air-fuel ratio from an output of air-fuel ratio sensor with highly accuracy.

2. Description of the Prior Art

It is a common practice to install an air-fuel ratio sensor at the exhaust system confluence point of an internal combustion engine to detect the air-fuel ratio at that location. A system of this type is taught by Japanese Laid-Open Patent Publication No. Sho 59(1984)-101,562, for example.

Aside from the above, the assignee earlier proposed designing a model describing the behavior of the sensor detection response delay and estimates the input air-fuel ratio of an air-fuel mixture supplied to the engine correctly from the output of an air-fuel ratio sensor disposed at the exhaust system confluence point by adjusting for the response delay, and then designing another model describing the behavior of the exhaust system and input the estimated confluence point air-fuel ratio adjusted for the response delay to the model, and constructing an observer for estimating the air-fuel ratios at the individual cylinders. (Japanese Patent Application No. Hei 3-359338; Japanese Laid-open Patent Publication No. Hei 5-180040 which was filed in the United States under the number of Ser. No. 07/997,769 and in EPO under the number of 92311841.8). The sensor used there is not an $O_2$ sensos which produces an inverted output only in the vicinity of the stoichiometric air-fuel ratio, but a wide-range air-fuel ratio sensor which produces a detection output proportional to the oxygen concentration of the exhaust gas.

In the detection, since the remaining burned gas in the cylinder is swept out by a piston as the exhaust gas in the course of an exhaust stroke, the behavior of the air-fuel ratio at the exhaust system confluence point of a multicylinder internal combustion engine is conceived to be synchronous with the Top Dead Center crank position. This means that the air-fuel ratio sampling through the aforesaid air-fuel ratio sensor should be conducted synchronizing with the TDC crank position, i.e. the sampling is not free from the crank angles of the engine. Since, however, the sampling interval varies with engine speed, when estimating the air-fuel ratio using the aforesaid model describing the behavior of the sensor detection response delay, it may sometime be difficult to accurately estimate the air-fuel ratio.

SUMMARY OF THE INVENTION

An object of the invention is therefore to overcome the problem and to provide an air-fuel ratio estimator for an internal combustion engine which enables, using the aforesaid model, to adjust for the sensor detection delay to estimate the air-fuel ratio, while reducing the influence of the engine speed to the least, whereby enhancing the air-fuel ratio detection accuracy.

Another object of the invention is to provide an air-fuel ratio estimator for a multicylinder internal combustion engine which enables, using the aforesaid second model describing the behavior of the exhaust system and the observer to estimate the air-fuel ratios at the individual cylinders with highly accuracy based on the estimated air-fuel ratio adjusted for the sensor detection response delay.

For realizing these objects, the present invention provides an air-fuel ratio estimator for estimating air-fuel ratio of an air and fuel mixture supplied to an internal combustion engine from an output of an air-fuel ratio sensor, including first means for approximating detection response lag time of the air-fuel ratio sensor as a first-order lag time system to produce state equation from the first-order lag time system, second means for discretizing the state equation for a period delta T to obtain a discretized state equation, third means for calculating a transfer function from the discretized state equation, fourth means for calculating an inverse transfer function from the transfer function, fifth means for determining a correction coefficient of the inverse transfer function and multiplying the inverse transfer function and the correction coefficient by said output of said air-fuel ratio sensor to estimate an air-fuel ratio of the air and fuel mixture supplied to the engine. The improvement comprises, a fifth means which determines the correction coefficient with respect to engine speed and makes the correction coefficient zero at or below a predetermined engine speed.

BRIEF DESCRIPTION OF THE DRAWINGS

These and other objects and advantages of the invention will be more apparent from the following description and drawings, in which.

DETAILED DESCRIPTION OF THE PREFERRED EMBODIMENTS

Figure 1:
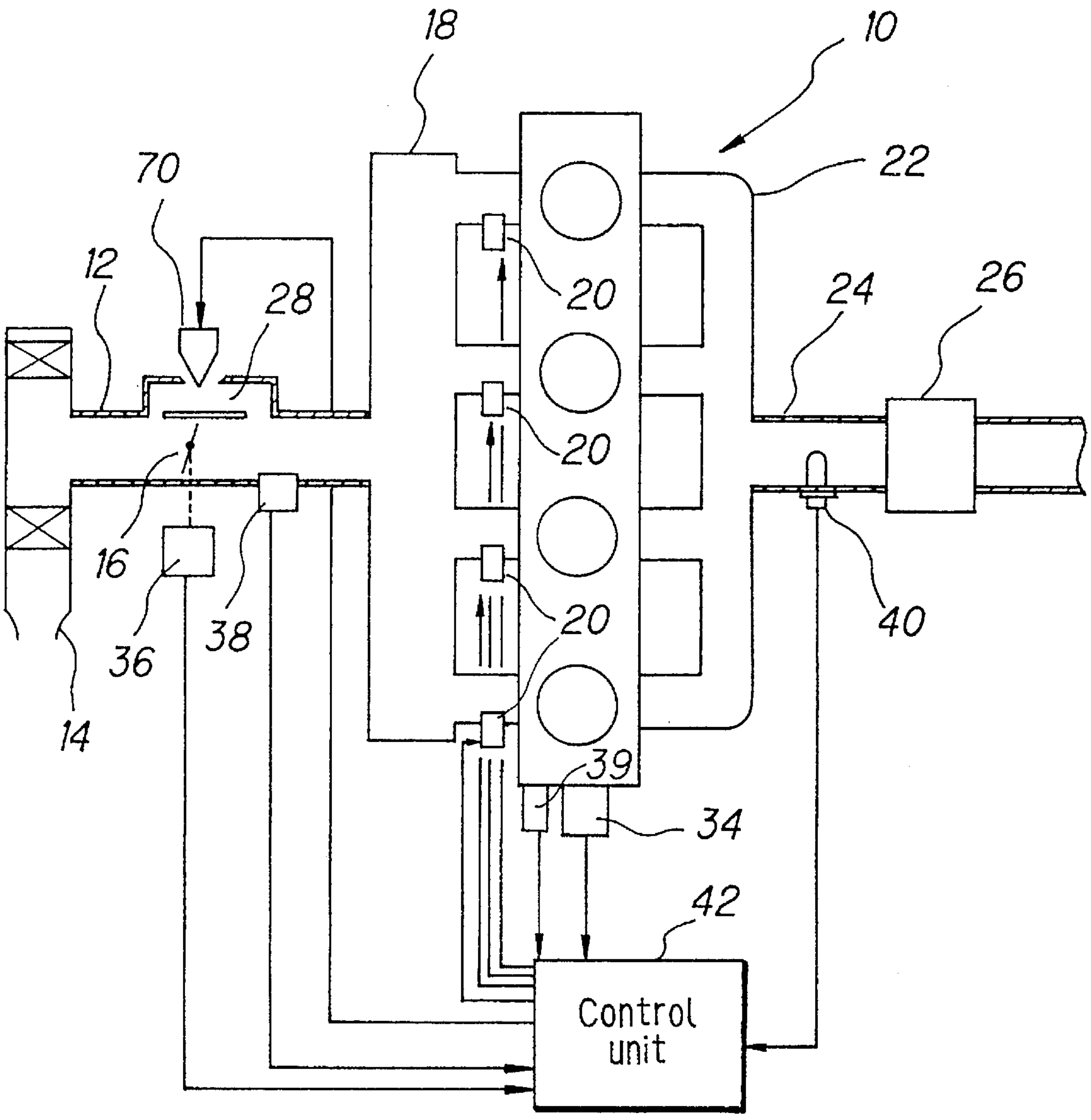
FIG. 1 is an overall schematic view of an air-fuel ratio estimator for internal combustion engine according to the present invention.

FIG. 1 is an overall schematic view of an air-fuel ratio estimator for an internal combustion engine according to this invention. Reference numeral 10 in this figure designates a four-cylinder internal combustion engine. Air drawn in through an air cleaner 14 mounted on the far end of an air intake passage 12 is supplied to the first to fourth cylinders through an intake manifold 18 while the flow thereof is adjusted by a throttle valve 16. An injector 20 for injecting fuel is installed in the vicinity of an intake valve (not shown) of each cylinder. The injected fuel mixes with the intake air to form an air-fuel mixture that is ignited in the associated cylinder by a spark plug (not shown). The resulting combustion of the air-fuel mixture drives down a piston (not shown). The exhaust gas produced by the combustion is discharged through an exhaust valve (not shown) into an exhaust manifold 22, from where it passes through an exhaust pipe 24 to a three-way catalytic converter 26 where it is removed of noxious components before being discharged to the exterior. In addition, the air intake path 12 is bypassed by a bypass 28 provided therein in the vicinity of the throttle valve 16.

A crankangle sensor 34 for detecting the piston crank angles is provided in an ignition distributor (not shown) of the internal combustion engine 10, a throttle position sensor 36 is provided for detecting the degree of opening of the throttle valve 16, and a manifold absolute pressure sensor 38 is provided for detecting the pressure of the intake air downstream of the throttle valve 16 as an absolute pressure. Additionally, a coolant water temperature sensor 39 is provided in a cylinder block (not shown) for detecting the temperature of a coolant water jacket (not shown) in the block. A wide-range air-fuel ratio sensor 40 constituted as an oxygen concentration detector is provided at a confluence point in the exhaust system between the exhaust manifold 22 and the three-way catalytic converter 26, where it detects the oxygen concentration of the exhaust gas at the confluence point and produces an output proportional thereto. The outputs of the crankangle sensor 34 and other sensors are sent to a control unit 42.

Figure 2:
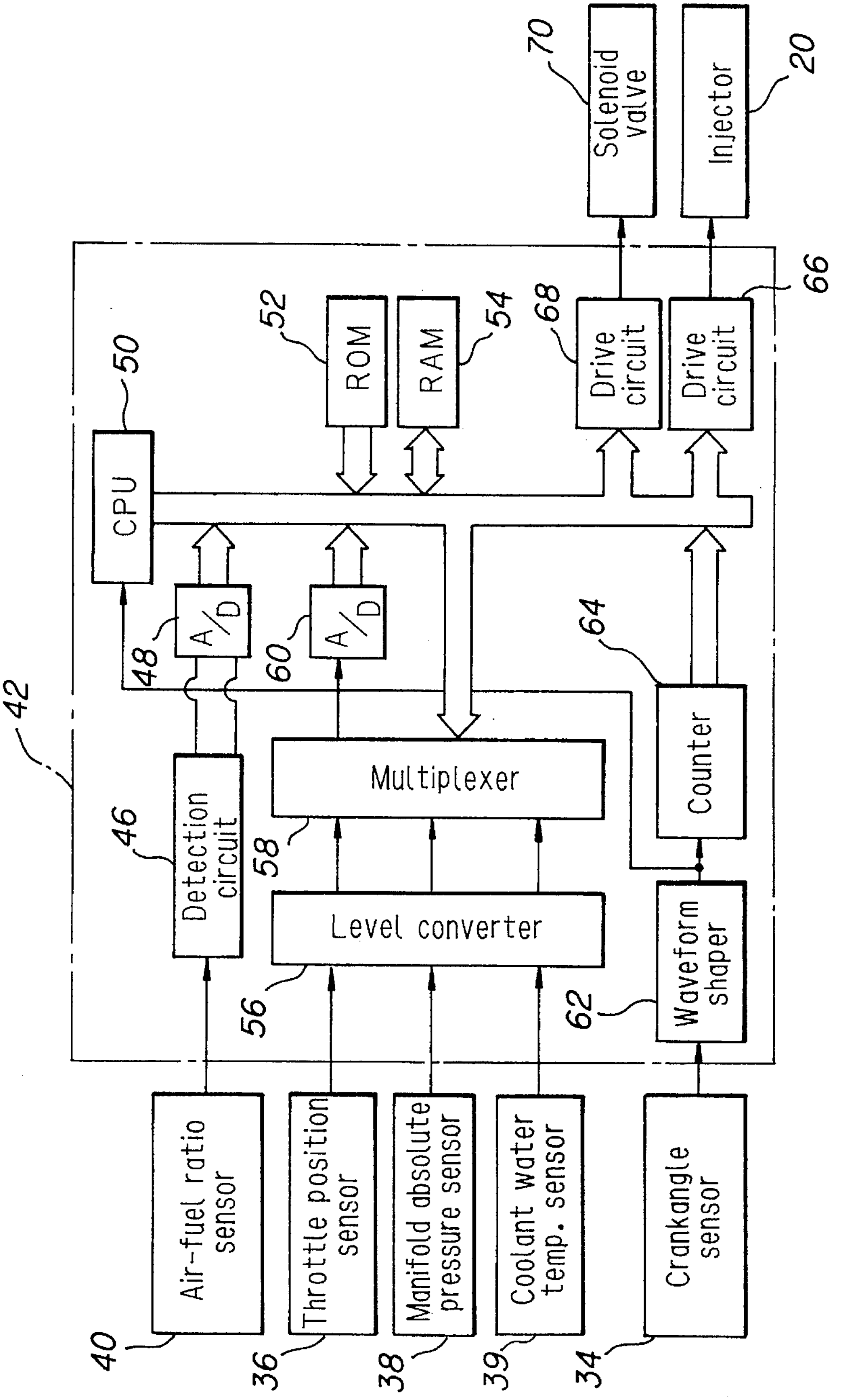
FIG. 2 is a block diagram showing the details of a control unit illustrated in FIG. 1.

Details of the control unit 42 are shown in the block diagram of FIG. 2. The output of the wide-range air-fuel ratio sensor 40 is received by a detection circuit 46 of the control unit 42, where it is subjected to appropriate linearization processing to obtain an air-fuel ratio (A/F) characterized in that it varies linearly with the oxygen concentration of the exhaust gas over a broad range extending from the lean side to the rich side. As this air-fuel ratio sensor is explained in detail in the assignee's Japanese Patent Application No. Hei 3-169456 (Japanese Laid-open Patent Publication No. Hei 4-369471 which was the U.S. Pat. No. 5,391,282), it will not be explained further here. Hereinafter in this explanation, the air-fuel ratio sensor will be referred to as an LAF sensor (linear A-by-F sensor). The output of the detection circuit 46 is forwarded through an A/D (analog/digital) converter 48 to a microcomputer comprising a CPU (central processing unit) 50, a ROM (read-only memory) 52 and a RAM (random access memory) 54 and is stored in the RAM 54.

Similarly, the analogue outputs of the throttle position sensor 36 etc. are input to the microcomputer through a level converter 56, a multiplexer 58 and a second A/D converter 60, while the output of the crankangle sensor 34 is shaped by a waveform shaper 62 and has its output value counted by a counter 64, the result of the count being input to the microcomputer. In accordance with commands stored in the ROM 52, the CPU 50 of the microcomputer uses the detected values to compute a manipulated variable, drives the injectors 20 of the respective cylinders via a drive circuit 66 for controlling fuel injection and drives a solenoid valve 70 via a second drive circuit 68 for controlling the amount of secondary air passing through the bypass 28 shown in FIG. 1.

Figure 3:
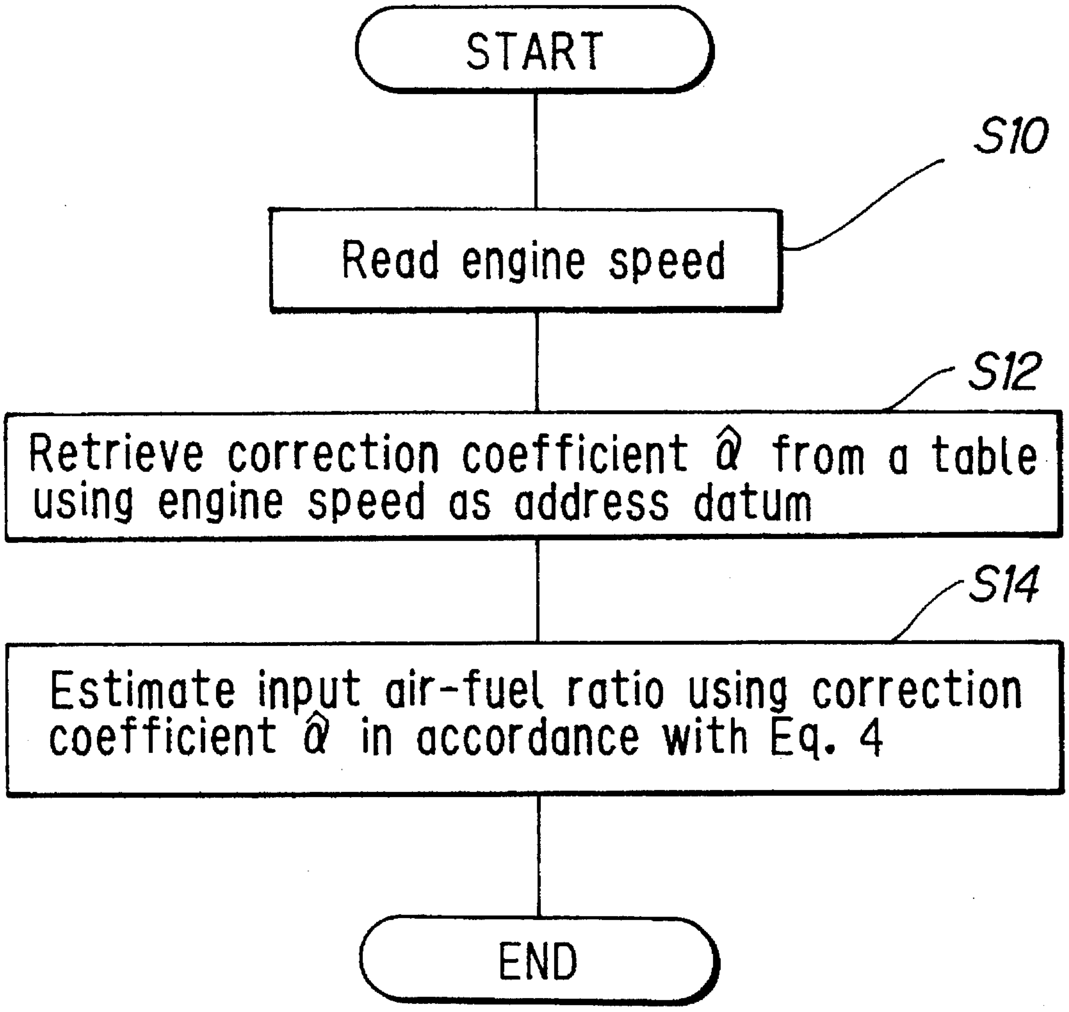
FIG. 3 is a flowchart showing the operation of the air-fuel ratio estimator for internal combustion engine illustrated in FIG. 1.

The operation of the system is shown by the flowchart of FIG. 3. For facilitating an understanding of the invention, however, the earlier proposed model describing the behavior of an exhaust system will be explained first.

Figure 4:
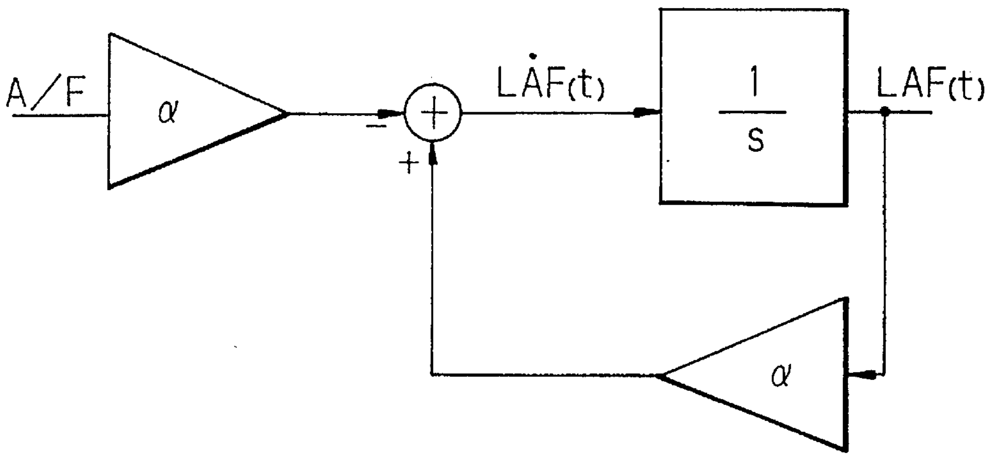
FIG. 4 is a block diagram showing a model describing the behavior of detection of an air-fuel ratio referred to in the assignee's earlier application.

For high-accuracy separation and extraction of the air-fuel ratios of the individual cylinders from the output of a single LAF sensor it is first necessary to accurately ascertain the detection response delay (lag time) of the LAF sensor. The inventors therefore used simulation to model this delay as a first-order lag time system. For this they designed the model shown in FIG. 4. Here, if we define LAF:LAF sensor output and A/F:input air-fuel ratio, the state equation can be written as $$L\dot{A}F(t)=\alpha LAF(t)-\alpha A/F(t) \qquad (1)$$

When this is discretized for period delta T, we get $$LAF(k+1)=\hat{\alpha}LAF(k)+(1-\hat{\alpha})A/F(k) \qquad (2)$$

Here, $\hat{\alpha}$ is a correction coefficient and is defined as:

$$\hat{\alpha}=1+\alpha\Delta T+(1/2!)\alpha^2\Delta T^2+(1/3!)\alpha^3T^3+(1/4!\alpha^4\Delta T^4$$

Figure 5:
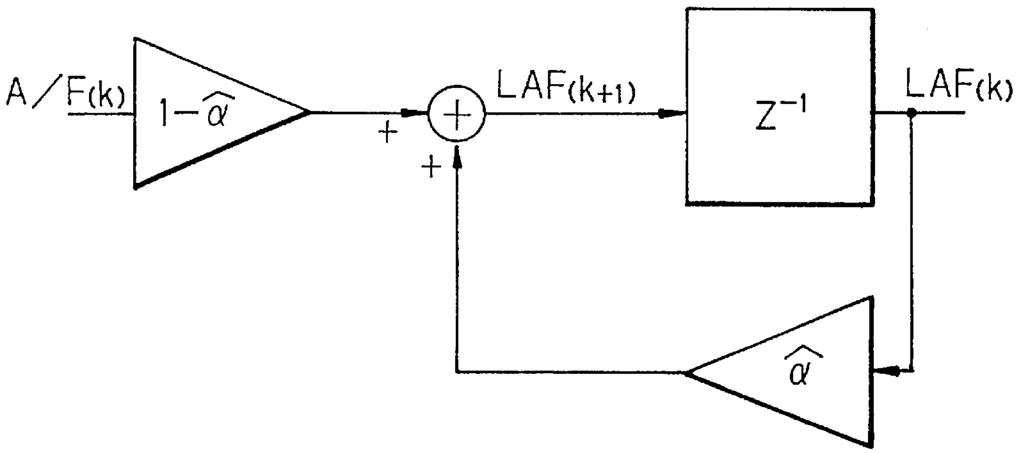
FIG. 5 is a block diagram showing the model of FIG. 4 discretized in the discrete-time series for period delta T.

Equation 2 is represented as a block diagram in FIG. 5.

Therefore, Equation 2 can be used to obtain the actual air-fuel ratio from the sensor output. That is to say, since Equation 2 can be rewritten as Equation 3, the value at time k−1 can be calculated back from the value at time k as shown by Equation 4.

$$A/F(k)=\{LAF(k+1)-\hat{\alpha}LAF\ (k)\}/(1-\hat{\alpha}) \qquad (3)$$

$$A/F(k-1)=\{LAF(k)-\hat{\alpha}LAF\ (k-1)\}/(1-\hat{\alpha}) \qquad (4)$$

Figure 6:
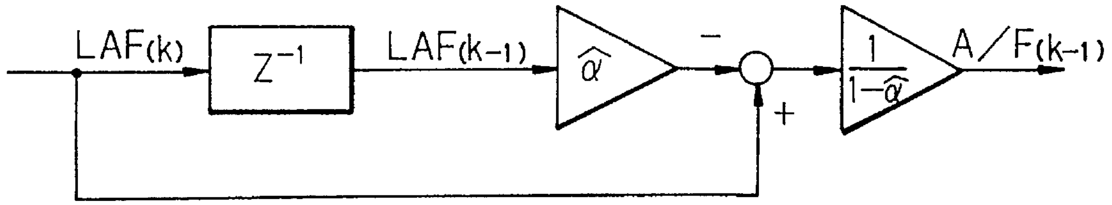
FIG. 6 is a block diagram showing a real-time air-fuel ratio estimator based on the model of FIG. 5.

Specifically, use of Z transformation to express Equation 2 as a transfer function gives Equation 5, and a real-time estimate of the air-fuel ratio input in the preceding cycle can be obtained by multiplying the sensor output LAF of the current cycle by the inverse transfer function and the correction coefficient $\hat{\alpha}$. FIG. 6 is a block diagram of the real-time air-fuel ratio estimator.

$$t(z)=(1-\hat{\alpha})/(Z-\hat{\alpha}) \qquad (5)$$

The method for separating and extracting the air-fuel ratios of the individual cylinders based on the actual air-fuel ratio obtained in the foregoing manner will now be explained. If the air-fuel ratio at the confluence point of the exhaust system is assumed to be an average weighted to reflect the time-based contribution of the air-fuel ratios of the individual cylinders, it becomes possible to express the air-fuel ratio at the confluence point at time k in the manner of Equation 6. (As F (fuel) was selected as the manipulated variable, the fuel-air ratio F/A is used here. For easier understanding, however, the air-fuel ratio will be used in the explanation so far as such usage does not lead to problems. The term "air-fuel ratio" (or "fuel-air ratio") used herein is the actual value corrected for the response lag time calculated according to Equation 5.)

$$\begin{aligned} [F/A](k) &= C_1[F/A\#_1] + C_2[F/A\#_3] + C_3[F/A\#_4] + C_4[F/A\#_2] \\ [F/A](k+1) &= C_1[F/A\#_3] + C_2[F/A\#_4] + C_3[F/A\#_2] + C_4[F/A\#_1] \\ [F/A](k+2) &= C_1[F/A\#_4] + C_2[F/A\#_2] + C_3[F/A\#_1] + C_4[F/A\#_3] \\ &\;\;\vdots \end{aligned} \tag{6}$$

Figure 7:
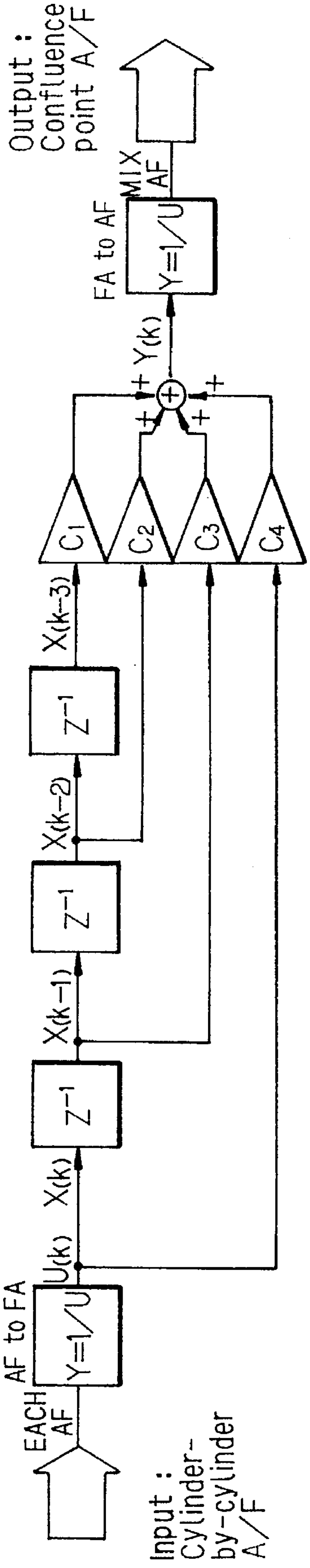
FIG. 7 is a block diagram showing a model describing the behavior of the exhaust system of the engine referred to in the assignee's earlier application.

More specifically, the air-fuel ratio at the confluence point can be expressed as the sum of the products of the past firing histories of the respective cylinders and weights C (for example, 40% for the cylinder that fired most recently, 30% for the one before that, and so on). This model can be represented as a block diagram as shown FIG. 7.

Its state equation can be written as $$\begin{pmatrix} x(k-2) \\ x(k-1) \\ x(k) \end{pmatrix} = \begin{pmatrix} 010 \\ 001 \\ 000 \end{pmatrix} \begin{pmatrix} x(k-3) \\ x(k-2) \\ x(k-1) \end{pmatrix} + \begin{pmatrix} 0 \\ 0 \\ 1 \end{pmatrix} u(k) \tag{7}$$

Further, if the air-fuel ratio at the confluence point is defined as y(k), the output equation can be written as $$y(k) = [c_1\ c_2\ c_3] \begin{pmatrix} x(k-3) \\ x(k-2) \\ x(k-1) \end{pmatrix} + c_4 u(k) \tag{8}$$

Here:

$c_1$:0.25379, $c_3$:0.10121, $c_3$:0.46111, $c_4$:0.18389

Since u(k) in this equation cannot be observed, even if an observer is designed from the equation, it will still not be possible to observe x(k). Thus, if one defines x(k+1)=x(k–3) on the assumption of a stable operating state in which there is no abrupt change in the air-fuel ratio from that 4 TDC earlier (i.e., from that of the same cylinder), Equation 9 is obtained.

$$\begin{pmatrix} x(k-2) \\ x(k-1) \\ x(k) \\ x(k+1) \end{pmatrix} = \begin{pmatrix} 0100 \\ 0010 \\ 0001 \\ 1000 \end{pmatrix} \begin{pmatrix} x(k-3) \\ x(k-2) \\ x(k-1) \\ x(k) \end{pmatrix} \tag{9}$$

$$y(k) = [c_1\ c_2\ c_3\ c_4] \begin{pmatrix} x(k-3) \\ x(k-2) \\ x(k-1) \\ x(k) \end{pmatrix}$$

Figure 8:
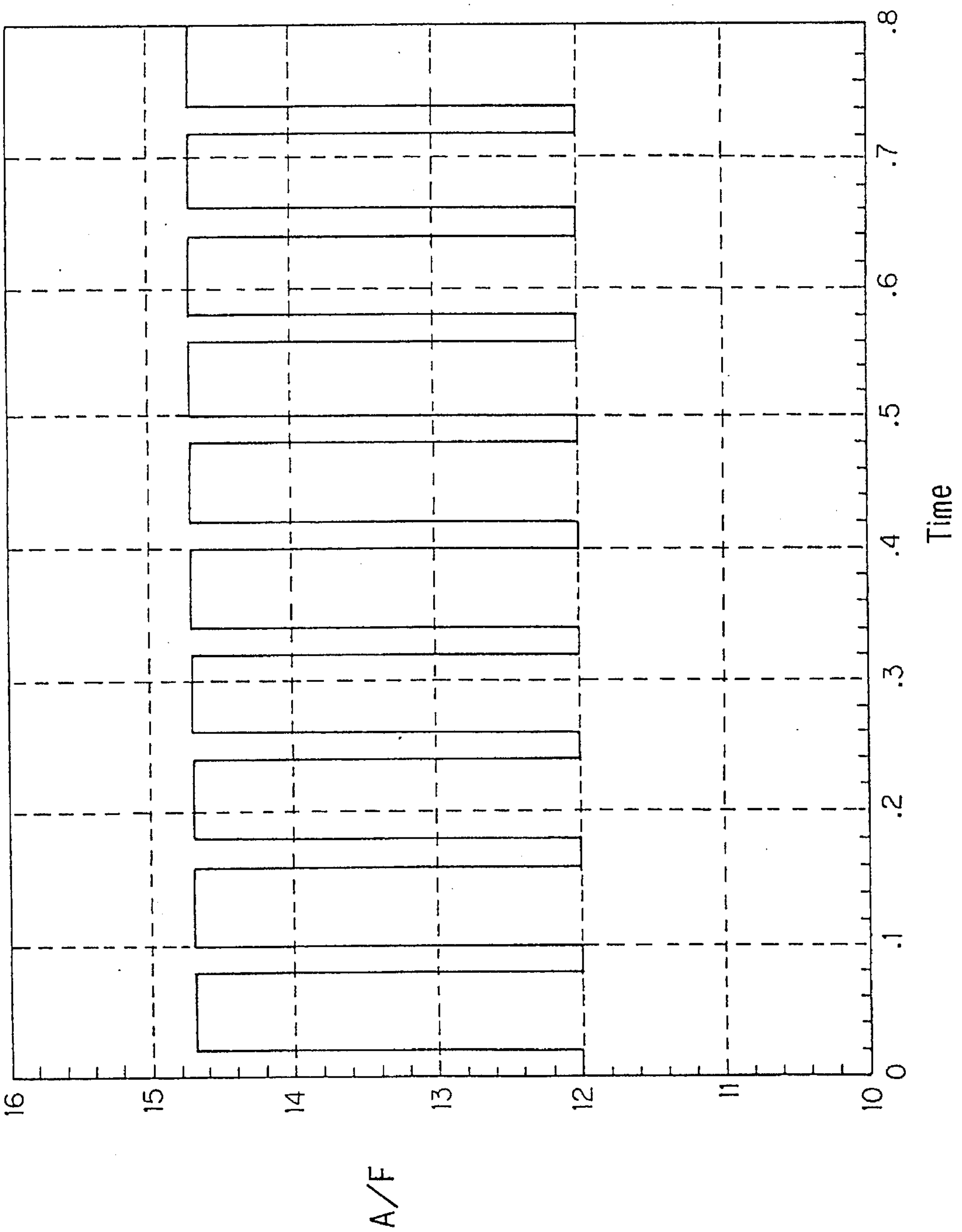
FIG. 8 is an explanatory view of simulation such that fuel is assumed to be supplied to three cylinders of a four-cylinder engine so as to obtain an air-fuel ratio of 14.7:1 and to one cylinder so as to obtain an air-fuel ratio of 12.0:1.
Figure 9:
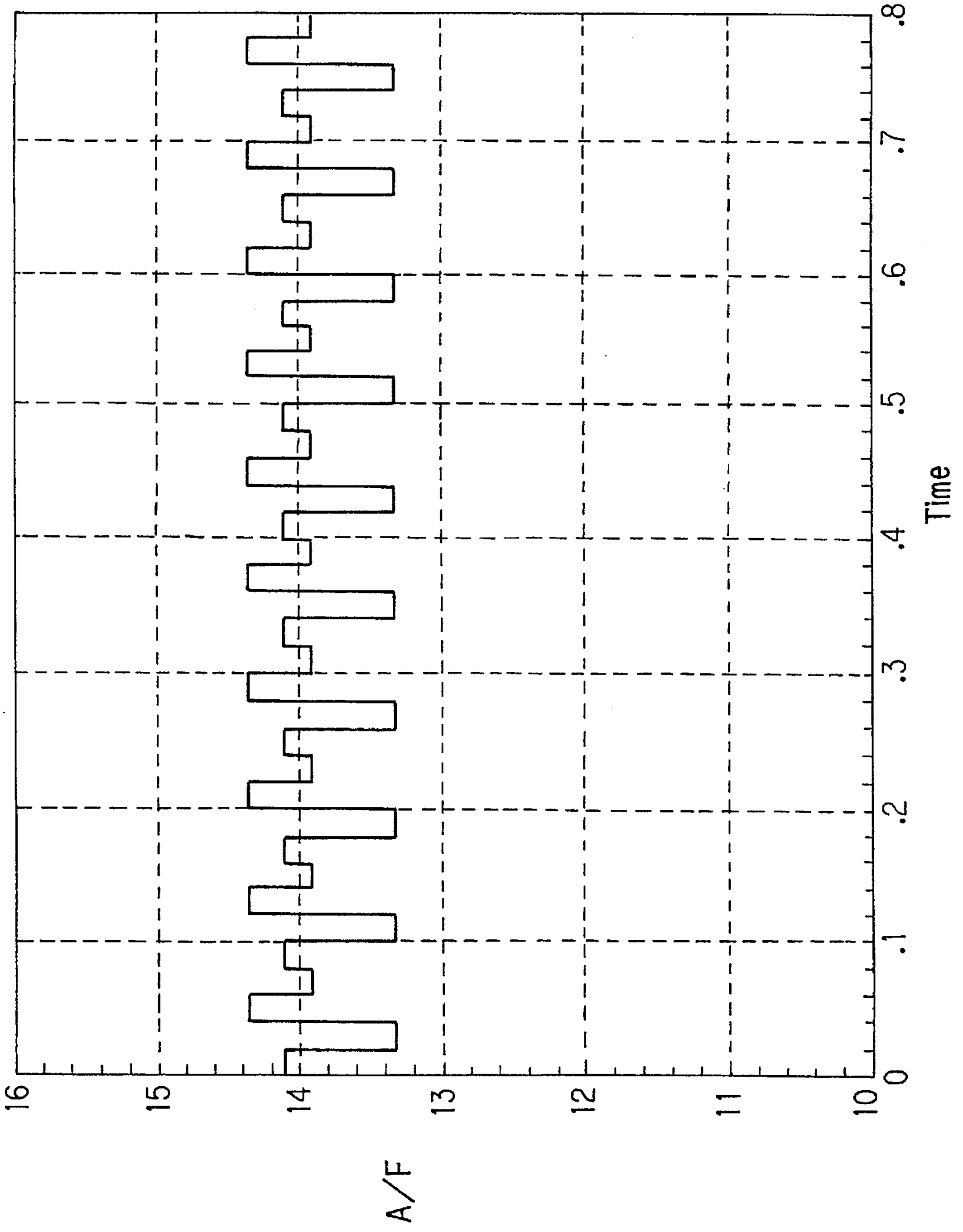
FIG. 9 is the result of the simulation showing the output of the exhaust system model indicative of the air-fuel ratio at a confluence point when the fuel is supplied in the manner illustrated in FIG. 8.
Figure 10:
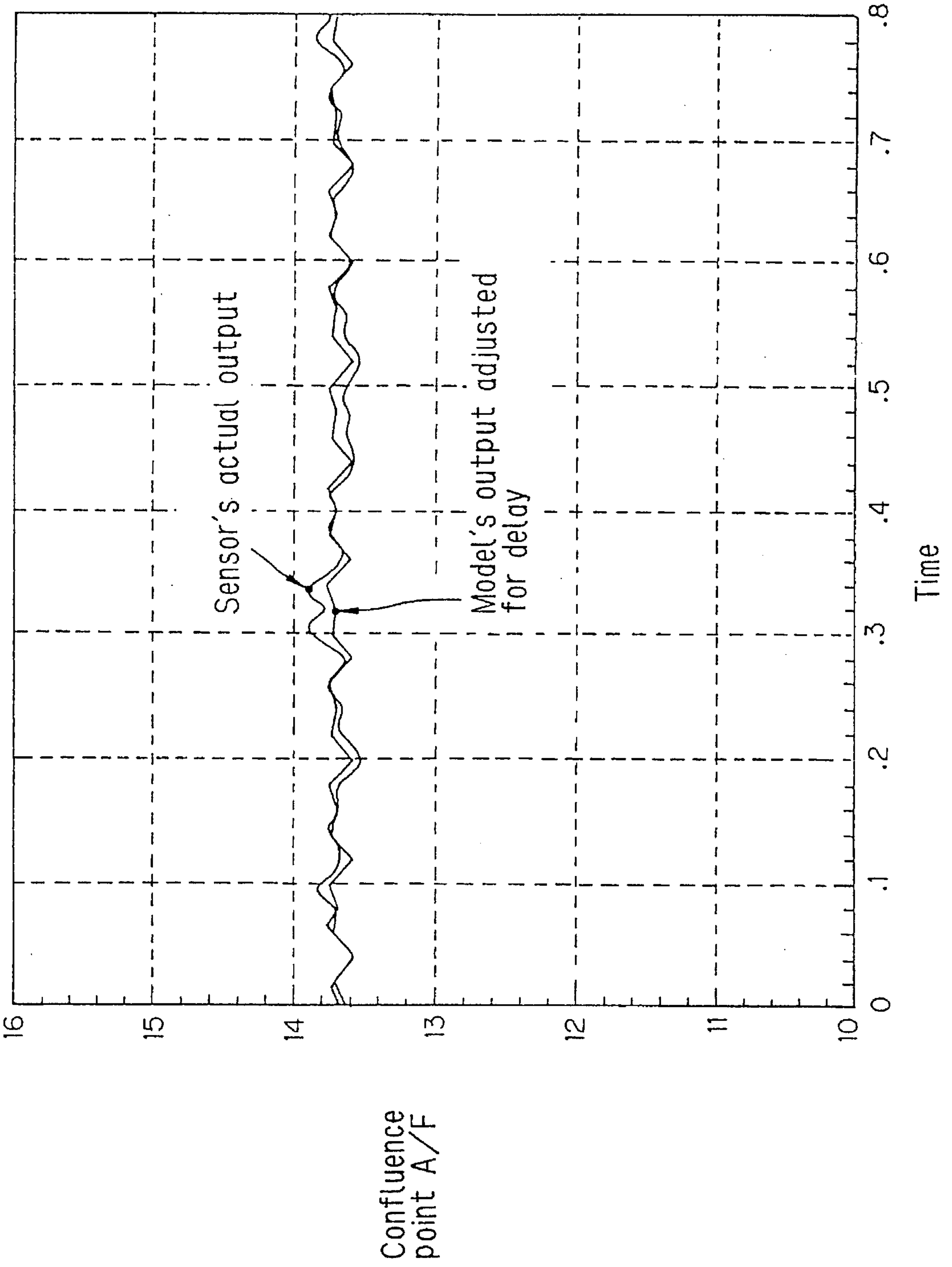
FIG. 10 is the result of the simulation showing the output of the exhaust system model adjusted for sensor detection response delay (time lag) in contrast with the sensor's actual output.

The simulation results for the model obtained in the foregoing manner will now be given. FIG. 8 relates to the case where fuel is supplied to three cylinders of a four-cylinder internal combustion engine so as to obtain an air-fuel ratio of 14.7:1 and to one cylinder so as to obtain an air-fuel ratio of 12.0:1. FIG. 9 shows the air-fuel ratio at this time at the confluence point as obtained using the aforesaid model. While FIG. 9 shows that a stepped output is obtained, when the response delay (lag time) of the LAF sensor is taken into account, the sensor output becomes the smoothed wave designated "Model's output adjusted for delay" in FIG. 10. The curve marked "Sensor's actual output" is based on the actually observed output of the LAF sensor under the same conditions. The close agreement of the model results with this verifies the validity of the model as a model of the exhaust system of a multiple cylinder internal combustion engine.

Thus, the problem comes down to one of an ordinary Kalman filter in which x(k) is observed in the state equation, Equation 10, and the output equation. When the weighted matrices Q, R are determined as in Equation 11 and the Riccati's equation is solved, the gain matrix K becomes as shown in Equation 12.

$$\begin{cases} X(k+1) = AX(k) + Bu(k) \\ y(k) = CX(k) + Du(k) \end{cases} \tag{10}$$

Here:

$$A = \begin{pmatrix} 0100 \\ 0010 \\ 0001 \\ 1000 \end{pmatrix} \quad C = [c_1\ c_2\ c_3\ c_4] \quad B = D = [0]$$

$$X(k) = \begin{pmatrix} x(k-3) \\ x(k-2) \\ x(k-1) \\ x(k) \end{pmatrix}$$

$$Q = \begin{pmatrix} 1000 \\ 0100 \\ 0010 \\ 0001 \end{pmatrix} \quad R = [1] \tag{11}$$

$$K = \begin{pmatrix} -0.3093 \\ 1.1918 \\ 0.3093 \\ 0.0803 \end{pmatrix} \tag{12}$$

Obtaining A–KC from this gives Equation 13.

$$A - KC = \begin{pmatrix} 0.0785 & 1.0313 & 0.1426 & 0.0569 \\ -0.3025 & -0.1206 & 0.4505 & -1.2192 \\ -0.0785 & -0.0313 & -0.1426 & 0.9431 \\ 0.9796 & -0.0081 & -0.0370 & -0.0148 \end{pmatrix} \tag{13}$$

Figure 11:
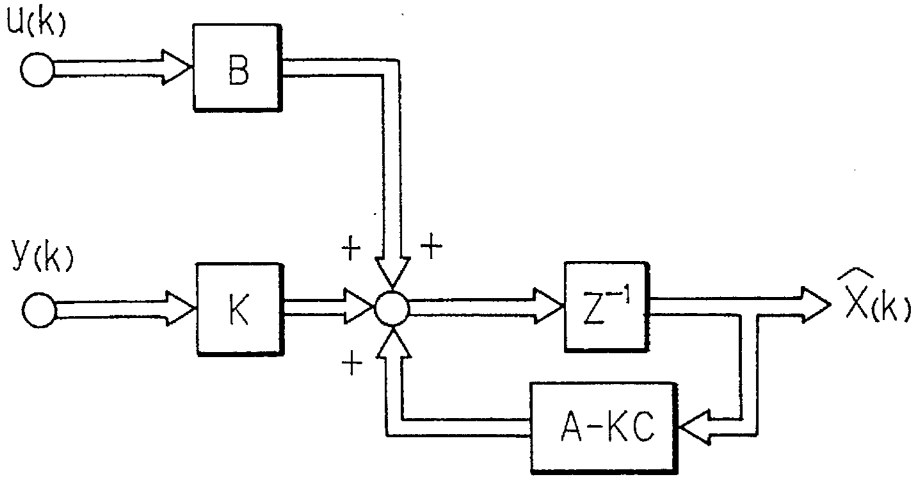
FIG. 11 is a block diagram showing the configuration of an ordinary observer.
Figure 12:
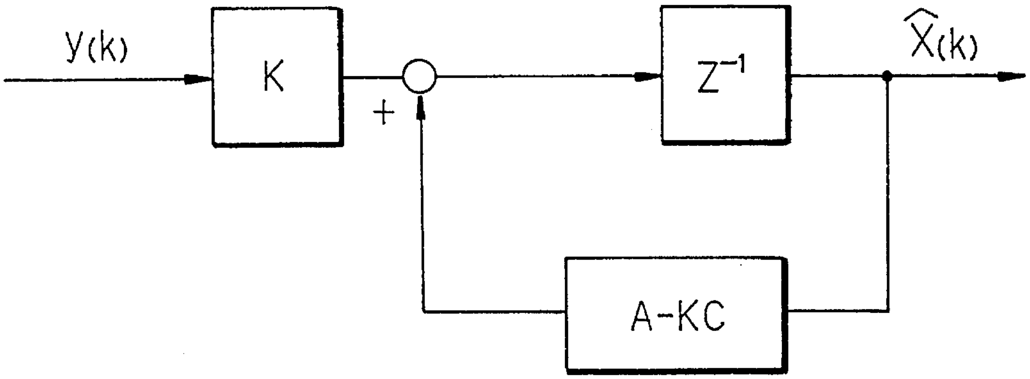
FIG. 12 is a block diagram showing the configuration of the observer referred to in the assignee's earlier application.

FIG. 11 shows the configuration of an ordinary observer. Since there is no input u(k) in the present model, however, the configuration has only y(k) as an input, as shown in FIG. 12. This is expressed mathematically by Equation 14.

$$\begin{cases} \hat{X}(k+1) = [A - KC]\hat{X}(k) + Ky(k) \\ \hat{x}(k) = [0001] \begin{pmatrix} \hat{x}(k-3) \\ \hat{x}(k-2) \\ \hat{x}(k-1) \\ \hat{x}(k) \end{pmatrix} \end{cases} \tag{14}$$

The system matrix of the observer whose input is y(k), namely of the Kalman filter, is $$S=\left(\begin{array}{c|c} A-KC & K \\ \hline 0001 & 0 \end{array}\right) \tag{15}$$

In the present model, when the ratio of the member of the weighted distribution R in Riccati's equation to the member of Q is 1:1, the system matrix S of the Kalman filter is given as $$S=\begin{pmatrix} 0.0785 & 1.0313 & 0.1426 & 0.0569 & -0.3093 \\ -0.3025 & -0.1206 & 0.4505 & -0.2192 & 1.1918 \\ -0.0785 & -0.0313 & -0.1426 & 0.9431 & 0.3093 \\ 0.9796 & -0.0081 & -0.0370 & -0.0148 & 0.0803 \\ 0.0 & 0.0 & 0.0 & 1.0 & 0.0 \end{pmatrix} \tag{16}$$

Figure 13:
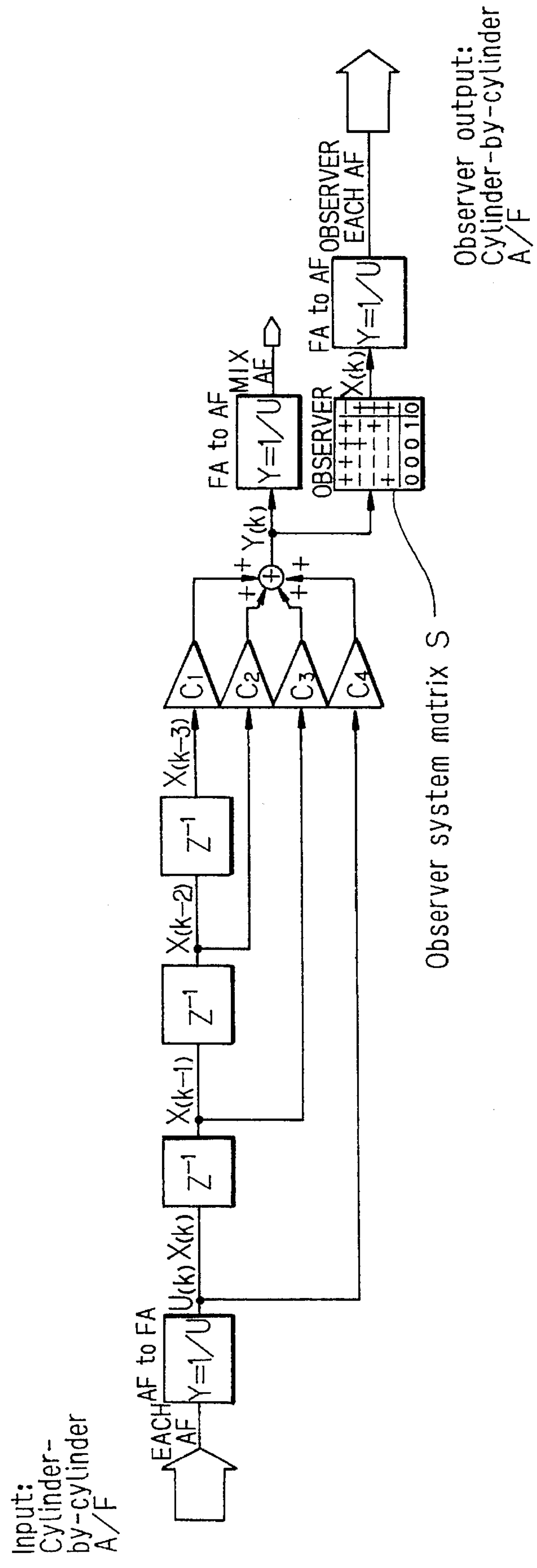
FIG. 13 is an explanatory block diagram showing the configuration combining the model of FIG. 7 and the observer of FIG. 12.

FIG. 13 shows the configuration in which the aforesaid model and observer are combined. As this was described in detail in the assignee's earlier application, further explanation is omitted here.

Figure 14:
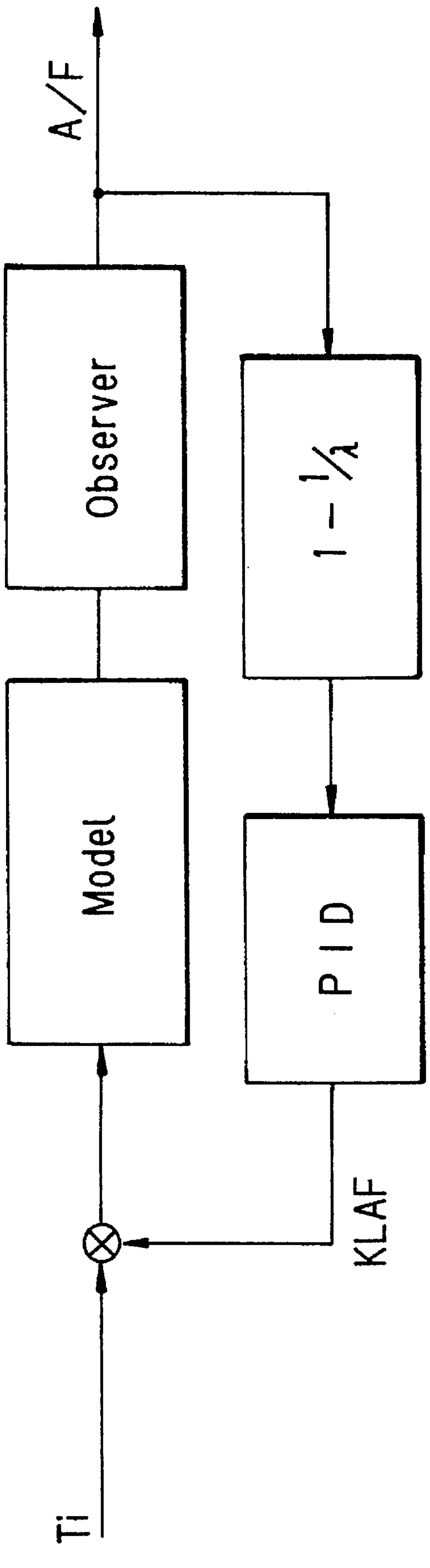
FIG. 14 is a block diagram showing an air-fuel ratio feedback control in which the air-fuel ratio is controlled to a desired ratio through a PID controller.

Since the observer is able to estimate the cylinder-by-cylinder air-fuel ratio (each cylinder's air-fuel ratio) from the air-fuel ratio at the confluence point, the air-fuel ratios of the individual cylinders can, as shown in FIG. 14, be separately controlled by a PID controller or the like.

Returning once again to the explanation on the model describing the behavior of the detection response delay of the LAF sensor, by assuming the delay as a first-order lag time system, by obtaining a state equation describing the behavior of the sensor detection, by discretizing it for period delta T to determine its transfer function and then by obtaining its inverse transfer function and its correction coefficient $\hat{\alpha}$ and multiplying them to the sensor output, it becomes possible to estimate the air-fuel ratio of the input air-fuel mixture at a real-time basis.

The correction coefficient $\hat{\alpha}$ depends on the sampling interval (delta T) as shown in Equation 2. Since the behavior of the air-fuel ratio is considered to be synchronous with the TDC crank position as mentioned before, the sampling will therefore be conducted depending on the crank angles. The sampling interval will accordingly depend on the engine speed and thus varies with the change of the engine speed.

Figure 16A:
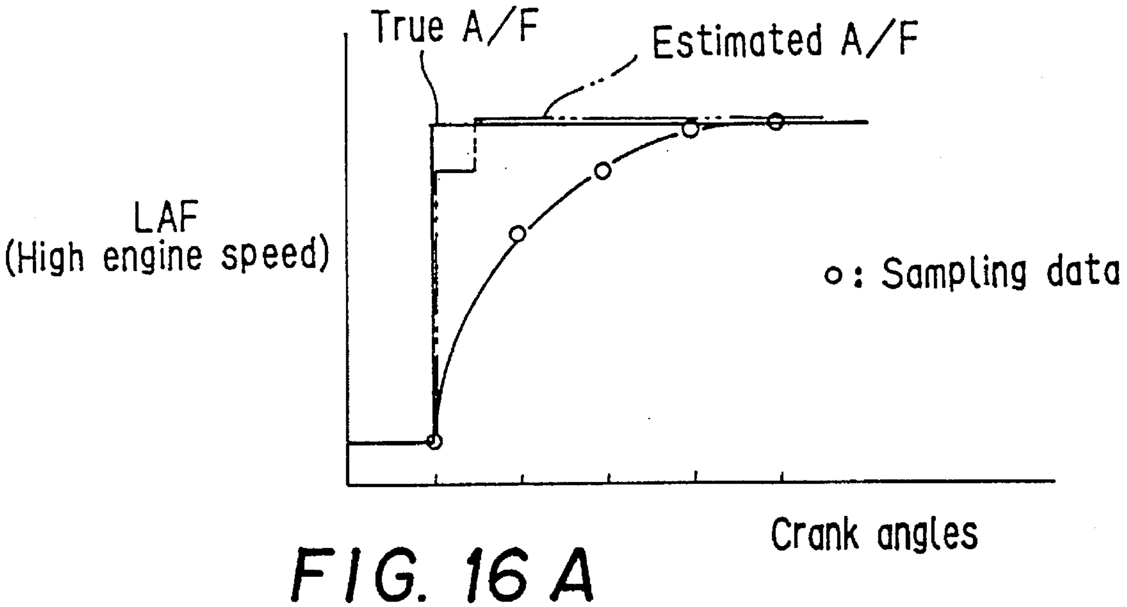
FIG. 16 is explanatory views showing the estimation of the observer at a high engine speed in contrast with that at a low engine speed.
Figure 16B:
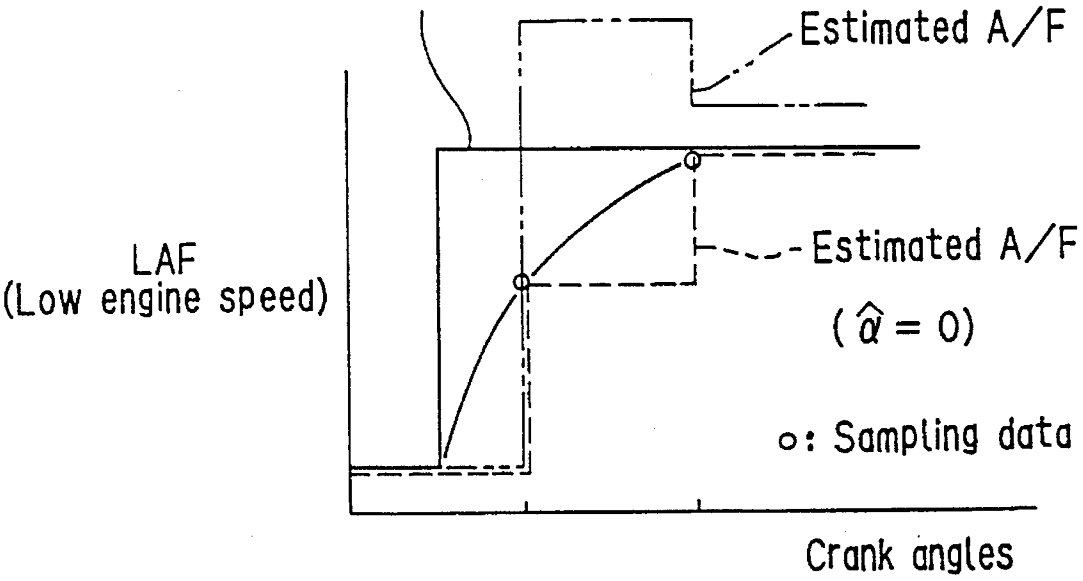

More specifically, when the engine is at a relatively high speed, since relatively large number of sampling data can be obtained as shown at the top in FIG. 16, the estimated air-fuel ratio (A/F) (illustrated by a phantom line) is close to the true air-fuel ratio (A/F) (illustrated by a solid line). At a low engine speed such as an idling speed of less than 1000 rpm for example, on the other hand, since the number of sampling data is less, the estimated air-fuel ratio (phantom line) is far from the true value (solid line), as shown in the bottom of FIG. 16. The same will be applicable when the sensor output includes noise. The inventors therefore conceived it advisable to discontinue the correction at such a low engine speed, and instead, to estimate the air-fuel ratio immediately from the sampling data as illustrated by a dashed line with "$\hat{\alpha}$=0" in the figure. The invention is based on this concept.

Now, the operation of the system according to the invention will be explained with reference to the flowchart of FIG. 3.

The program begins at step S10 in which the engine speed is read and proceeds to step S12 in which the correction coefficient $\hat{\alpha}$ is determined by retrieving a lookup table using the engine speed as address datum, and to step S14 in which the input air-fuel ratio (at the preceding cycle) is estimated using the correction coefficient $\hat{\alpha}$ in accordance with Equation 4.

Figure 15:
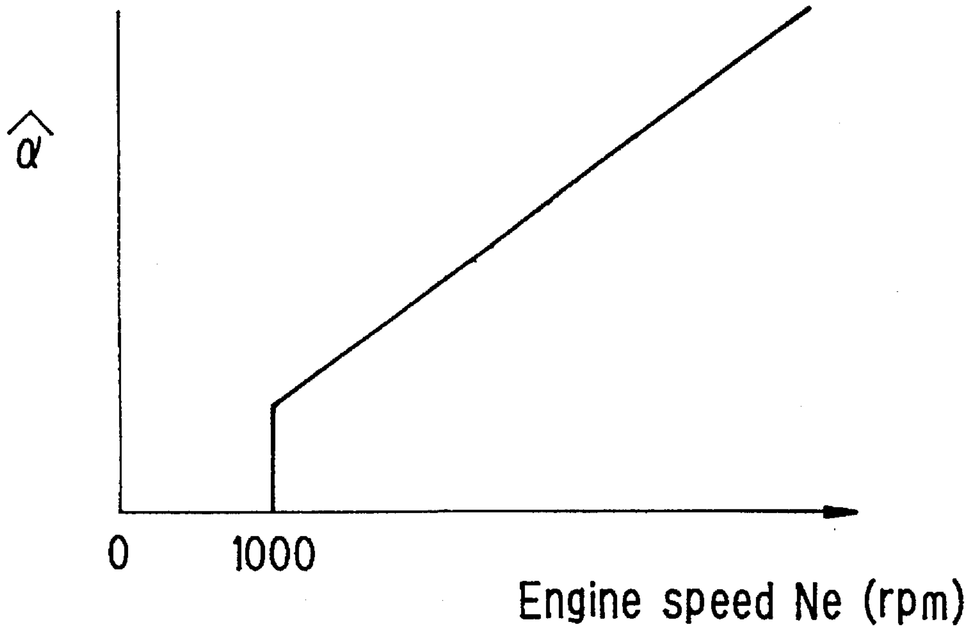
FIG. 15 is an explanatory view showing the characteristic of a correction coefficient to be used in the flowchart of FIG. 3.

FIG. 15 shows the characteristic of the correction coefficient $\hat{\alpha}$. As illustrated, the correction coefficient $\hat{\alpha}$ is set to be increased with increasing engine speed Ne such that the sampling interval is constant over almost the entire range of engine speeds. Moreover, the correction coefficient $\alpha$ is set to be zero at or below a predetermined engine speed such as 1000 rpm during idling. As a result, when the engine is at or below the predetermined speed, zero is substituted for $\hat{\alpha}$ in Equation 4 and yields A/F(k−1)=LAF(k). That is, the input air-fuel ratio will be estimated as the value (illustrated by a dashed line with "$\hat{\alpha}$=0" in FIG. 16) which the control unit 42 has recognized immediately from the sampling data. Needless to say, the estimated value has not been adjusted for the detection delay and hence is not equal to the true air-fuel ratio (solid line in FIG. 16). However, estimation error decreases to a great extent when comparing with the value illustrated by a phantom line that would otherwise be obtained through estimation.

With the arrangement, it becomes possible to enhance the detection accuracy of the air-fuel ratio in a low engine speed during idling. Further, since the correction coefficient $\hat{\alpha}$ is prepared in advance as a table lookup, the calculation period can therefore be reduced, enhancing estimation accuracy at a high engine speed. Furthermore, when the estimated air-fuel ratio adjusted for the sensor detection response delay is input to the second model describing the behavior of the exhaust system and the observer, the air-fuel ratios at the individual cylinders can accordingly be obtained with highly accuracy. And, it becomes possible to improve the control accuracy if the estimated values are used for an air-fuel ratio feedback control.

It should be noted that the invention is not limited to this arrangement and can instead be configured to have air-fuel ratio sensors (LAF sensors) disposed in the exhaust system in a number equal to the number of cylinders and so as to detect the air-fuel ratios in the individual cylinders based on the outputs of the individual sensors.

Moreover, while the embodiment has been explained with respect to the case of using a wide-range air-fuel ratio sensor (LAF sensor) as the air-fuel ratio sensor, it is alternatively possible to control the air-fuel ratio using an $O_2$ sensor.

The present invention has thus been shown and described with reference to specific embodiments. However, it should be noted that the present invention is in no way limited to the details of the described arrangements but changes and modifications may be made without departing from the scope of the appended claims.

What is claimed is:

1. An air-fuel ratio estimator for estimating air-fuel ratio of an air and fuel mixture supplied to an internal combustion engine from an output of an air-fuel ratio sensor, comprising:

response lag time detection means for approximating detection response lag time of the air-fuel ratio sensor;

air-fuel ratio determining means for determining an actual air-fuel ratio based upon said detection response lag time;

real-time estimator means for determining a real-time estimate of the air-fuel ratio based upon the actual air-fuel ratio and a correction coefficient; and correction coefficient determining means for determining said correction coefficient to correct the real-time estimate of the air-fuel ratio of the air and fuel mixture supplied to the engine, wherein said correction coefficient determining means for determining said correction coefficient with respect to engine speed and for making said correction coefficient zero at or below a predetermined engine speed wherein said predetermined engine speed is an idling engine speed, and, wherein said correction coefficient increases with increasing engine speed.

2. An air-fuel ratio estimator for estimating air-fuel ratio of an air and fuel mixture supplied to an internal combustion engine from an output of an air-fuel ratio sensor, comprising:

response lag time detection means for approximating detection response lag time of the air-fuel ratio sensor;

air-fuel ratio determining means for determining an actual air-fuel ratio based upon said detection response lag time;

real-time estimator means for discretizing a period and for determining a real-time estimate of the air-fuel ratio based upon the actual air-fuel ratio and a correction coefficient that depends upon said period; and correction coefficient determining means for determining said correction coefficient to correct the real-time estimate of the air-fuel ratio of the air and fuel mixture supplied to the engine, wherein said correction coefficient determining means for determining said correction coefficient with respect to engine speed and for making said correction coefficient zero at or below a predetermined engine speed.

3. An air-fuel ratio estimator for estimating air-fuel ratio of an air and fuel mixture supplied to an internal combustion engine from an output of an air-fuel ratio sensor, comprising:

response lag time detection means for approximating detection response lag time of the air-fuel ratio sensor;

air-fuel ratio determining means for determining an actual air-fuel ratio based upon said detection response lag time;

real-time estimator means for determining a real-time estimate of the air-fuel ratio based upon the actual air-fuel ratio and a correction coefficient; and correction coefficient determining means for determining said correction coefficient to correct the real-time estimate of the air-fuel ratio of the air and fuel mixture supplied to the engine, wherein said correction coefficient determining means for determining said correction coefficient with respect to engine speed and for making said correction coefficient zero at or below a predetermined engine speed, wherein said engine is a multicylinder engine and said air-fuel ratio sensor is installed at a location at least either at or downstream of a confluence point of an exhaust system from a plurality of cylinders of multicylinder engine, and further comprising confluence air-fuel ratio determining means for determining an air-fuel ratio at the confluence point of the exhaust system based upon the real-time estimate of the air-fuel ratio;

cylinder weight determining means for determining a weighted distribution of each cylinder at the confluence point based upon time from firing of the cylinder; and cylinder air-fuel ratio determining means for determining the air-fuel ratio of each cylinder based upon said weighted distribution and said air-fuel ratio at the confluence point.

4. An air-fuel ratio estimator according to claim 2, wherein said engine is a multicylinder engine and said air-fuel ratio sensor is installed at a location at least either at or downstream of a confluence point of an exhaust system from a plurality of cylinders of multicylinder engine.

5. An air-fuel ratio estimator according to claim 2, wherein said predetermined engine speed is an idling engine speed.

6. An air-fuel ratio estimator according to claim 4, wherein said predetermined engine speed is an idling engine speed.

7. An air-fuel ratio estimator according to claim 3, wherein said predetermined engine speed is an idling engine speed.

8. An air-fuel ratio estimator for estimating air-fuel ratio of an air and fuel mixture supplied to an internal combustion engine from an output of an air-fuel ratio sensor, comprising:

response lag time detection means for approximating detection response lag time of the air-fuel ratio sensor;

air-fuel ratio determining means for determining an actual air-fuel ratio based upon said detection response lag time;

real-time estimator means for determining a real-time estimate of the air-fuel ratio based upon the actual air-fuel ratio and a correction coefficient; and correction coefficient determining means for determining said correction coefficient to correct the real-time estimate of the air-fuel ratio of the air and fuel mixture supplied to the engine, wherein said correction coefficient determining means for determining said correction coefficient with respect to engine speed and for making said correction coefficient zero at or below a predetermined engine speed, wherein said correction coefficient increases with increasing engine speed.

9. An air-fuel ratio estimator according to claim 3, wherein said correction coefficient increases with increasing engine speed.

* * * * *